United States Patent
Nathan et al.

(10) Patent No.: US 9,355,188 B2
(45) Date of Patent: May 31, 2016

(54) SMART CONTENT OPTIMIZATIONS BASED UPON ENTERPRISE PORTAL CONTENT META-MODEL

(75) Inventors: Eyal Nathan, Tel Aviv (IL); Nimrod Barak, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 491 days.

(21) Appl. No.: 13/568,883

(22) Filed: Aug. 7, 2012

(65) Prior Publication Data

US 2014/0046910 A1 Feb. 13, 2014

(51) Int. Cl.
*G06F 17/30* (2006.01)

(52) U.S. Cl.
CPC .... *G06F 17/30905* (2013.01); *G06F 17/30371* (2013.01)

(58) Field of Classification Search
CPC ................ G06F 17/30286; G06F 17/30067; G06F 17/30008; G06F 17/30595
USPC ................................................. 707/690, 691
See application file for complete search history.

(56) References Cited

U.S. PATENT DOCUMENTS

| | | | |
|---|---|---|---|
| 7,984,417 B2 | 7/2011 | Ben-Zvi et al. | |
| 8,489,561 B1 | 7/2013 | Nathan et al. | |
| 8,554,776 B1 | 10/2013 | Barak et al. | |
| 8,566,330 B1 | 10/2013 | Barak et al. | |
| 8,583,678 B2 | 11/2013 | Vainer et al. | |
| 8,661,328 B2 | 2/2014 | Barak et al. | |
| 8,756,292 B2 | 6/2014 | Lehmann et al. | |
| 8,862,597 B2 | 10/2014 | Barak et al. | |
| 2004/0205691 A1* | 10/2004 | Poole et al. | 717/100 |
| 2009/0007062 A1* | 1/2009 | Gilboa | 717/105 |
| 2011/0283270 A1* | 11/2011 | Gass et al. | 717/168 |
| 2012/0246122 A1* | 9/2012 | Short et al. | 707/690 |
| 2013/0127920 A1 | 5/2013 | Grinshpon et al. | |
| 2013/0166678 A1 | 6/2013 | Barak et al. | |
| 2013/0227422 A1 | 8/2013 | Lehmann et al. | |
| 2013/0238583 A1 | 9/2013 | Lehmann et al. | |
| 2013/0239012 A1 | 9/2013 | Barak | |
| 2013/0268889 A1 | 10/2013 | Barak et al. | |
| 2013/0282894 A1 | 10/2013 | Barak et al. | |
| 2013/0283146 A1 | 10/2013 | Barak et al. | |
| 2014/0004852 A1 | 1/2014 | Lehmann et al. | |
| 2014/0046910 A1 | 2/2014 | Nathan et al. | |
| 2014/0059144 A1 | 2/2014 | Lehmann et al. | |
| 2014/0068509 A1 | 3/2014 | Kadishay et al. | |
| 2014/0068545 A1 | 3/2014 | Lehmann et al. | |
| 2014/0068589 A1 | 3/2014 | Barak | |
| 2014/0071091 A1 | 3/2014 | Barak et al. | |
| 2014/0081683 A1 | 3/2014 | Barak | |
| 2014/0164893 A1 | 6/2014 | Pariente et al. | |
| 2014/0189804 A1 | 7/2014 | Lehmann et al. | |
| 2014/0198958 A1 | 7/2014 | Eyal et al. | |
| 2014/0236331 A1 | 8/2014 | Lehmann et al. | |

* cited by examiner

*Primary Examiner* — Robert Beausoliel, Jr.
*Assistant Examiner* — Nirav K Khakhar
(74) *Attorney, Agent, or Firm* — Fish & Richardson P.C.

(57) ABSTRACT

The disclosure generally describes computer-implemented methods, software, and systems for optimizing enterprise portal content. One computer-implemented method includes receiving a content analysis request associated with a content repository, analyzing, using at least one computer, content objects associated with the content repository for inconsistencies with a meta-model, receiving content optimization suggestion data, modifying, by operation of at least one computer, the content repository content objects using the content optimization suggestion data, and receiving optimization status data.

15 Claims, 5 Drawing Sheets

SMART CONTENT OPTIMIZATIONS BASED UPON ENTERPRISE PORTAL CONTENT META-MODEL

BACKGROUND

Many enterprise portal system content administration tools are based upon use of content meta-models. Enterprise portal system administrators use modeling tools to describe and implement enterprise portal content structures and for applying relevant permissions on enterprise portal content structures, for example business objects and business-object relationships. When using the administrative modeling tools, modeling concept and tool complexity and uncoordinated/inconsistent additions, changes, and/or deletions of and to the often many available enterprise portal content structures results in difficult administration of the enterprise portal system content. An inability to effectively administer enterprise portal content structures often leads to a high total cost of ownership for the enterprise portal system.

SUMMARY

The present disclosure relates to computer-implemented methods, software, and systems for optimizing enterprise portal content. One computer-implemented method includes receiving a content analysis request associated with a content repository, analyzing, using at least one computer, content objects associated with the content repository for inconsistencies with a meta-model, receiving content optimization suggestion data, modifying, by operation of at least one computer, the content repository content objects using the content optimization suggestion data, and receiving optimization status data.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

In a first aspect, combinable with the general implementation, the analysis of the content repository content objects is performed by a content analyzer.

In a second aspect, combinable with any of the previous aspects, the content optimization suggestion data comprises content optimization objects.

In a third aspect, combinable with any of the previous aspects, a particular content modification object of the content optimization objects represents at least one suggested optimization to a particular content object to rectify an identified inconsistency between the content object and the meta-model.

In a fourth aspect, combinable with any of the previous aspects, determining that a content object optimization is to be performed.

In a fifth aspect, combinable with any of the previous aspects, the determination that the content object optimization is to be performed is made based upon input received by a graphical user interface, wherein content optimization selections are selected.

In a sixth aspect, combinable with any of the previous aspects, the modification of the content repository content objects is performed by a content optimization service.

In a seventh aspect, combinable with any of the previous aspects, modifying a portal content directory consistent with the modifications made to the content repository content objects.

The subject matter described in this specification can be implemented in particular implementations so as to realize one or more of the following advantages. First, inconsistencies between content repository objects and meta-models can be more easily identified and rectified. The analysis process is automated and an administrator makes a final decision as to which discovered inconsistencies to correct, if any. Second, enterprise portal content may be efficiently analyzed on a regular basis and the content and underlying meta-model to be kept in a more consistent state. Third, total cost of ownership to administer enterprise portal content is reduced. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The disclosure generally describes computer-implemented methods, software, and systems optimizing enterprise portal content. For the purposes of this disclosure, an enterprise resource portal (ERP), also known as an enterprise information portal (EIP) or a corporate portal, is a framework for integrating information, people, and processes across organizational boundaries. An ERP provides a secure unified access point, often in the form of a web-based user interface, and is designed to aggregate and personalize information through application-specific portals. The ERP is a de-centralized content contribution and content management system, which keeps the information always updated. With only a web browser, enterprise portal users can begin work once they have been authenticated in the ERP which offers a single point of access to information, enterprise applications, and services both inside and outside an organization. ERPs may present information from diverse sources in a unified and structured way, and provide additional services, such as dashboards, an internal search engine, e-mail, news, navigation tools, and various other features. ERPs are often used by enterprises for providing their employees, customers, and possibly additional users with a consistent look and feel, and access control and procedures for multiple applications, which otherwise would have been separate entities altogether.

Figure 1:
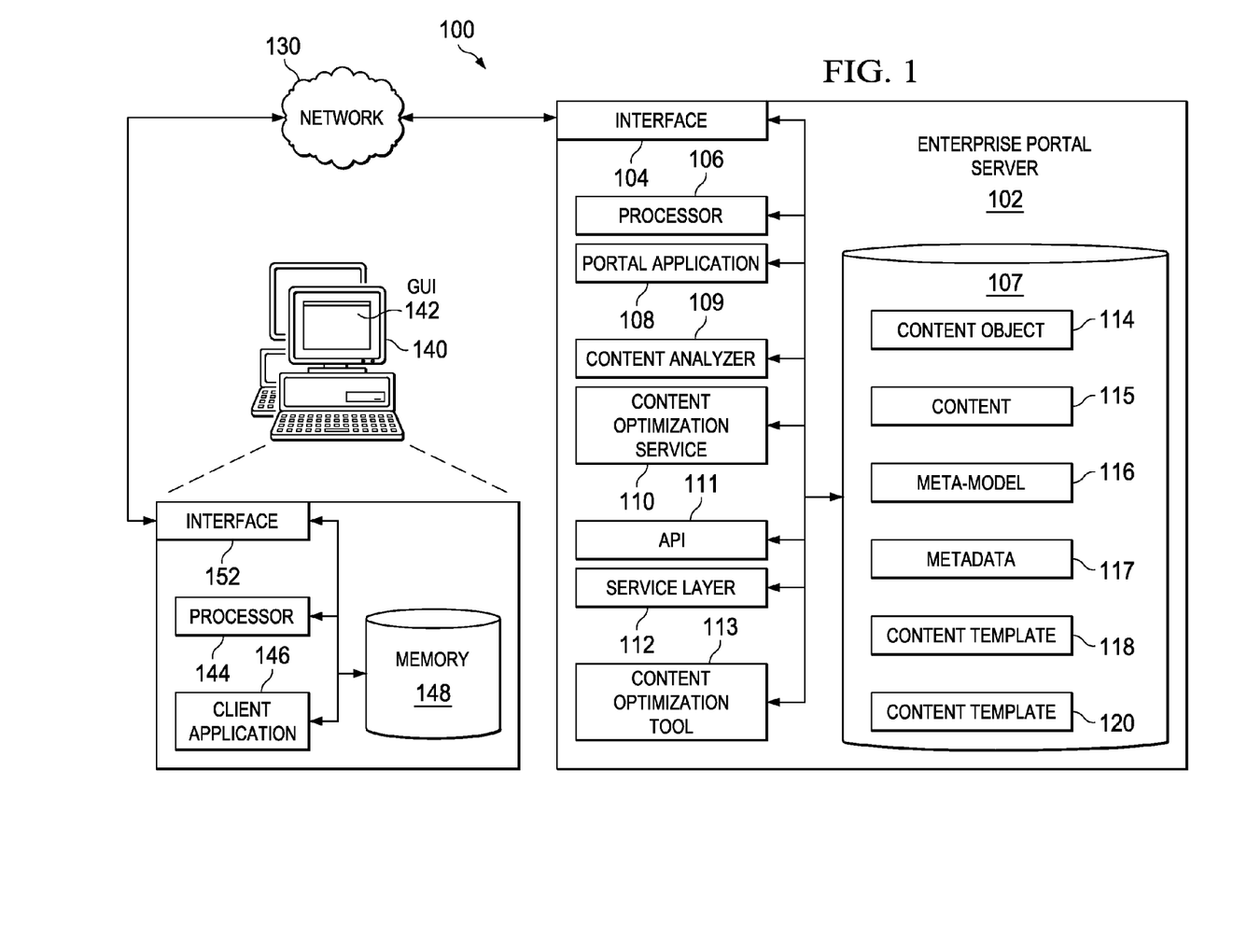
FIG. 1 is a block diagram illustrating an example distributed computing system optimizing enterprise portal content.

FIG. 1 is a block diagram illustrating an example distributed computing system 100 for optimizing enterprise portal content. In some implementations, updating enterprise portal content structures can be automatic. Specifically, the illustrated example distributed computing system 100 includes or is communicably coupled with an enterprise portal server (EPS) 102 and a client 140 that communicate across a network 130.

At a high level, the EPS server 102 is an electronic computing device operable to receive, transmit, process, store, or manage data and information associated with the example distributed computing system 100. Generally, the EPS server 102 allows users to compose, modify, delete, and deploy enterprise portal pages. Specifically, the described computer-implemented methods, software, and systems provide functionality for optimizing enterprise portal content through a graphical user interface (GUI) providing a user with an efficient and user-friendly presentation of data provided by or communicated within the example distributed computing system 100.

The EPS 102 is responsible for receiving application requests, for example enterprise portal navigation requests, from one or more client applications associated with the client 140 of the example distributed computing system 100 and responding to the received requests by processing said requests in the associated portal application 108, and sending the appropriate response from the portal application 108 back to the requesting client application 146. In addition to requests from the client 140, requests associated with the portal applications may also be sent from internal users, external or third-party customers, other automated applications, as well as any other appropriate entities, individuals, systems, or computers. According to one implementation, EPS 102 may also include or be communicably coupled with an e-mail server, a web server, a caching server, a streaming data server, and/or other suitable server.

The EPS 102 contains a business application 108, a content analyzer 109, a content optimization service 110, and a content optimization tool 113 where at least a portion of the business application 108, the content analyzer 109, the content optimization service 110, and the content optimization tool 113 is executed using requests/responses sent from/to a client 140 within and communicably coupled to the illustrated example distributed computing system 100 using network 130. In some implementations, requests/responses can be sent directly to EPS 102 from a user accessing EPS 102 directly. In some implementations, the EPS 102 may store a plurality of various business applications 108, content structure analyzers 109, content optimization service 110, and content optimization tools 113. In some implementations, the EPS 102 may comprise a web server, where one or more of the components of EPS 102 represent web-based applications accessed and executed by the client 140 using the network 130 or directly at the EPS 102 to perform the programmed tasks or operations of the various components of EPS 102.

In some implementations, any and/or all of components of the EPS 102, both hardware and/or software, may interface with each other and/or the interface using an application programming interface (API) 111 and/or a service layer 112. The API 111 may include specifications for routines, data structures, and object classes. The API 111 may be either computer language independent or dependent and refer to a complete interface, a single function, or even a set of APIs. The service layer 112 provides software services to the example distributed computing system 100. The functionality of the EPS 102 may be accessible for all service consumers using this service layer. Software services, such as provide reusable, defined business functionalities through a defined interface. For example, the interface may be software written in extensible markup language (XML) or other suitable language. While illustrated as an integrated component of the EPS 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The EPS 102 includes an interface 104. Although illustrated as a single interface 104 in FIG. 1, two or more interfaces 104 may be used according to particular needs, desires, or particular implementations of the example distributed computing system 100. The interface 104 is used by the EPS 102 for communicating with other systems in a distributed environment—including within the example distributed computing system 100—connected to the network 130; for example, the client 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The EPS 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the EPS 102. Specifically, the processor 106 executes the functionality required to optimize enterprise portal content structures.

The EPS 102 also includes a memory 107 that holds data for the enterprise server 102. Although illustrated as a single memory 107 in FIG. 1, two or more memories may be used according to particular needs, desires, or particular implementations of the example distributed computing system 100. While memory 107 is illustrated as an integral component of the EPS 102, in alternative implementations, memory 107 can be external to the EPS 102 and/or the example distributed computing system 100. In some implementations, the memory 107, i.e., the content repository for the ERP that holds the description and/or data for all objects in the ERP, includes one or more instances of a content object 114, content 115, a meta-model 116, metadata 117, and a content template 118.

The content object 114 can be considered a representation of a business/non-business entity, such as an employee, a sales order, an invoice, a financial report, etc. The content object 114 may encompass both functions, for example in the form of methods, and data, such as one or more properties. For example, content objects 114 may reduce system complexity by reducing a system into smaller units. The implementation details of content objects 114 are typically hidden from a non-development user and may be accessed through the defined functions and encapsulated data. Content objects 114 also form a point of entry of the functions and data of a system and enable the system to easily share, communicate, display, or otherwise operate with other systems. A content object 114 may also be considered the target of a request for data, for example a navigation node in an ERP, a web page, or the final destination of a navigation action, etc. and may contain the view to be displayed when the content object 114 is accessed. In some implementations, the content object 114 can control the location of a selected view, personalized views for a specific enterprise portal user, and dynamic views. Metadata 117 may be used to determine the context of a particular displayed view.

The content 115 is encountered as part of the user experience when accessing a content object 114 within an enterprise portal. The content 115 may include, among other things: text, images, sounds, videos, and animations. While illustrated as integrated with memory 107 of the EPS 102 in the example distributed computing system 100, in alternative implementations, the content 115 can be external to the EPS 102 and/or the example distributed computing system 100 or can be internal to the content object 114.

Figure 2:
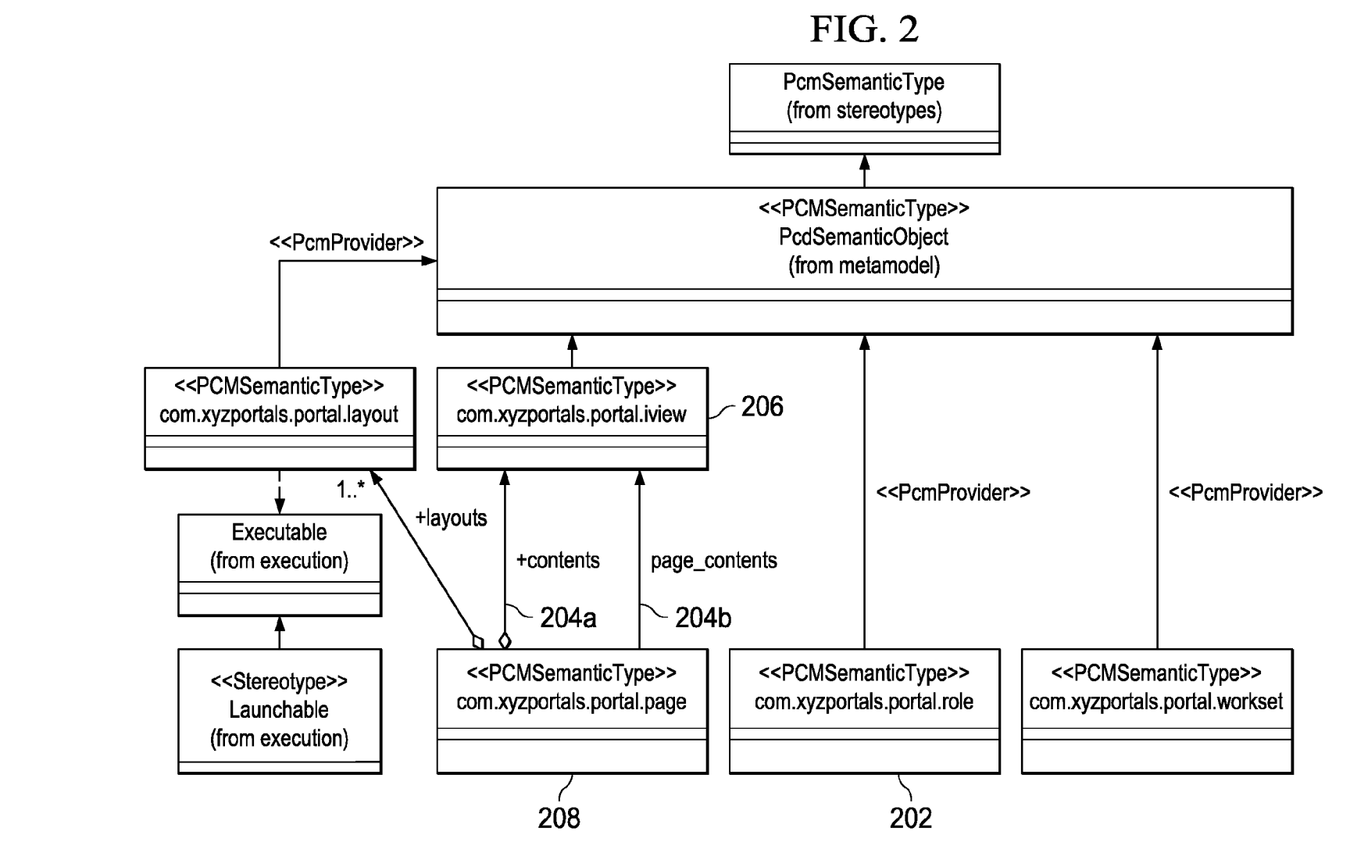
FIG. 2 illustrates an example enterprise portal content meta-model.

The meta-model 116 is an enterprise portal content meta-model (EPCMM), a set of definitions that describe basic enterprise portal objects, for example content objects, and relations between the enterprise portal objects. The EPCMM defines at a high-level how content objects in an enterprise portal interact, and also properties of those content objects. Turning now to FIG. 2, FIG. 2 illustrates an example EPCMM 200. In some implementations, an EPCMM 200 can be described using a Unified Modeling Language (UML) diagram, but in other implementations, the EPCMM 200 can be described using any suitable representational scheme and/or method. For example, as illustrated in FIG. 2, an EPCMM definition of a semantic object com.xyzportals.portal.role ("Role") 202 is shown. The Role may have a set of properties defined by metadata 117, for example a "Title" property defining the title of a Role with a value of "HR Manager." Metadata 117 may also contain data applicable to other defined objects, software, hardware, etc. and be accessible by any component of the example distributed computing system 100. As illustrated, the EPCMM also defines relationships 204a and 204b between the com.xyzportals.portal.iview ("iView") semantic object 206 and the com.xyzportals.portal.page ("Page") semantic object 208. For example, the 204a indicates that Page semantic object 208 may contain iView semantic objects 206 but not Role semantic objects 202.

Returning to FIG. 1, using the EPCMM, a content model 120 may be created using a set of definitions that extend the EPCMM meta-model definitions and describe the enterprise portal content objects 114 that derive from the EPCMM meta-model used to represent an organization's structure, content structure, process flow, etc. For example, a Role object instance called "HR Manager Role" can derive from the meta-model 116 entity Role semantic object 202. It will include all the characteristic of the parent Role semantic object 202, and extend them with specific properties and/or relations relevant to the "HR Manager" role in the organization. For example, the HR Manager Role could include an extended relation with a "Portal Page" Page object derived from the Page semantic object 206 which has a defined rule in which enterprise portal pages of type "HR Page" include the HR Manager Role object.

As illustrated in FIG. 2, the EPCMM does not support a Role semantic object 202 as part of a Page semantic object 208. If an administrative user chooses to add an extended relation between the Role semantic object 202 and the Page semantic object 208, for example through the use of an automated process, application code, and/or in some other suitable manner, an inconsistency will exist between the meta-model 116 and the enterprise portal content model 120 unless the meta-model 116 is updated to reflect at least the added relationship between a Role and a Page or the content objects 114 are corrected to reflect the relationships defined by the meta-model 116.

Returning to FIG. 1, while illustrated as integrated with memory 107 of the enterprise portal server in the example distributed computing system 100, in alternative implementations meta-model 116 can be external to the EPS 102 and/or the example distributed computing system 100. Likewise, while illustrated as integrated with memory 107 of the enterprise portal server in the example distributed computing system 100, in alternative implementations metadata 117 can be external to the EPS 102 and/or the example distributed computing system 100.

The EPS 102 further includes a content analyzer 109. The content analyzer 109 can perform an analysis of the content repository 107 and identify inconsistencies between the content object 114 and metadata 117 defined for the meta-model 116 applicable to the content object 114. The inconsistency analysis may include any suitable matching and/or comparison method, algorithm, or technique.

Examples of inconsistencies identifiable by the content analyzer 109 include:
New object type—a content object 114 of an unknown type is found within the content repository 107 but there is no corresponding parent object defined in the meta-model 116 for that content object 114 type. In this case, optimization may include, for example deleting the unknown object type.
Properties—an unknown property is defined for a content object 114, an illegal value exists for a defined property for a content object 114, and/or a defined property is missing for a content object 114. In these cases, optimization may include, for example, deleting the unknown property, resetting the illegal value to a default value, and re-adding the missing property with a default value, respectively.
Entity relationships—unknown relationships are defined between content objects 114. Example entity relationship types include:
Containment—parent-child relationships between content objects 114, according to their location in the hierarchical content repository 107. For example, if an containment relation defines that an object of type "Role" exists as a child within an object of type "Page" where the meta-model 116 indicates that there is no containment relationship of this type between a Page object and a Role object. In this case, an optimization may include, for example, removing Role object from the Page object.
Property Based—for example, a content object 114 references another content object 114 by storing its Uniform Resource Identifier (URI) as a property. In this example, the relationship name is then derived from the referencing property name. For example, if a content object 114 of type "iView" has a property called "helpPage" the value of which is the URI of a content object 114 of type "Page," where a knowledge relationship from an iView content object to a Page content object does not exist within the meta-model 116. In this case, an optimization may include, for example, removing the helpPage property and/or resetting the property to a default value.

As should be apparent to those skilled in the art, other types of inconsistencies and entity relationship types may also be analyzed without departing from the scope of this disclosure.

Figure 3:
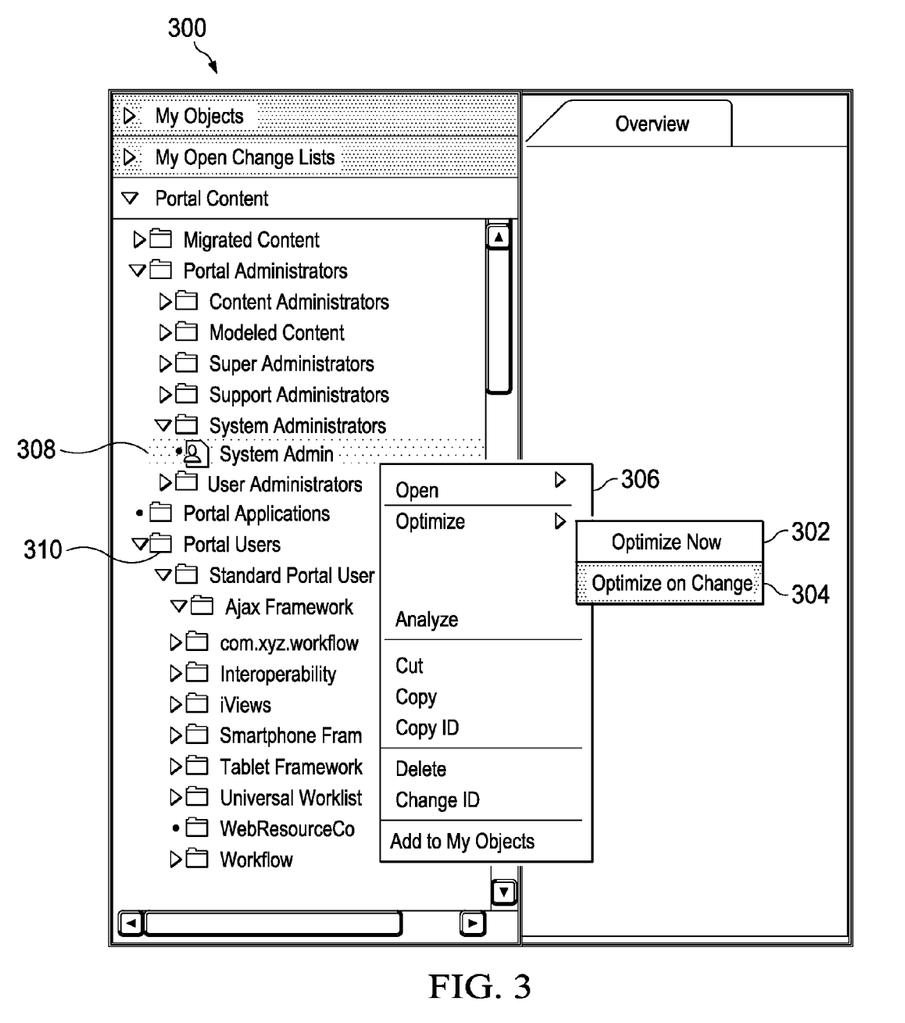
FIG. 3 illustrates an example administrative modeling tool interface.

A user may start a content analyzer 109 content analysis using a GUI or other suitable interface. In some implementations, the content analysis can be triggered by a GUI application and/or iView. The GUI application and/or iView will be available to administrators through standard portal navigation, for example a link on the top of a page that will launch the content optimization tool 113 (described below) or to start an automated optimization process. Turning now to FIG. 3, FIG. 3 illustrates a screenshot of a graphical user interface 300 within the portal administration environment to trigger optimization of enterprise portal content structures. 302 indicates an "Optimize Now" content optimization option while 304 indicates an "Optimize on Change" content optimization option that may be triggered using a GUI context menu associated with a content object. For example, the illustrated context menu 306 is triggered from a "System Admin" role context object 308. Other methods of selecting content objects and optimization methods will be apparent to those skilled in the art. In some implementations, a user can select a sub-tree of content to be optimized by indicating that the action should be performed on a folder, such as "Portal Users" 310. If selecting a folder, in some implementations, the folder and all content objects associated with the selected folder will be optimized according to a selected content optimization option. In some implementations a global option can be set to optimize all content according to one and/or more of the available content optimization options. In other implementations, no global content optimization option is available.

Optimize Now

Figure 4:
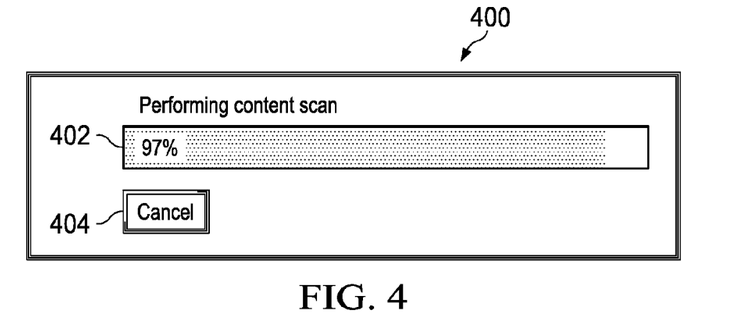
FIG. 4 illustrates an example content scan status interface.

The Optimize Now option 302 starts an optimization process immediately using one or more of the content analyzer 109, the content optimization service 110, and/or the content optimization tool 113. Turning now to FIG. 4, FIG. 4 illustrates an example content scan status interface 400 with a status indicator 402 and operations available to the user (e.g., Cancel) 404 that is presented to the user by the content optimization tool 113 during the content analyzer 109 analysis operation. In this example, the status indicator indicates the content scan is 97% complete. Other status interface types, information, and/or operations may be presented and/or available to the user without departing from the scope of this disclosure. In some implementations, the content scan status interface 400 is displayed if the Optimize Now option 302 is selected and is not displayed if the Optimize on Change option 304 is selected.

Figure 5:
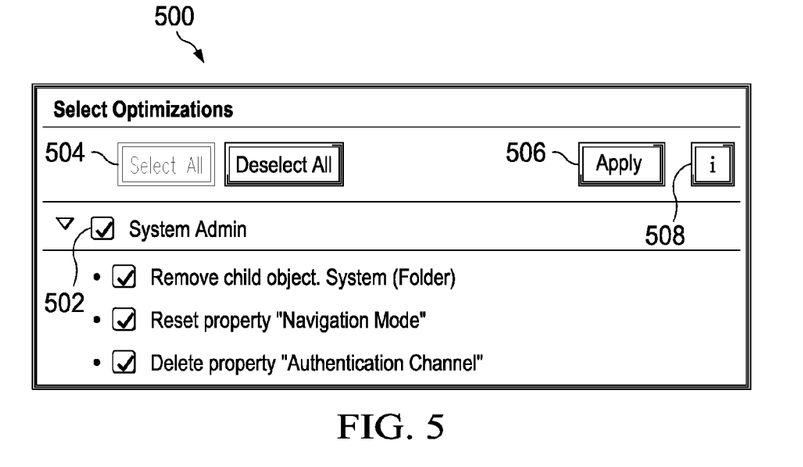
FIG. 5 illustrates an example select optimizations interface.

Turning now to FIG. 5, FIG. 5 illustrates an example select optimizations interface 500 presented to a user by the content optimization tool 113 (described below) once the content analyzer 109 analysis operation is complete. The Select Optimizations interface 500 lists example suggested content object 114 modifications to be applied to the content objects 114. As illustrated, the Select Optimizations interface 500 includes suggested content object 114 optimizations 502, selection buttons 504, an application button 506 to apply the selected optimizations 502 to the content objects 114, and an information button 508 which can provide, when selected, additional inline, contextual help. For example, selecting the information button 508 can provide instructions to a user such as "Select the desired content objects to optimize," "Click the 'Apply' button to apply the optimizations to the selected content objects," or other suitable help messages. In some implementations, selecting the information button 508 can provide help and/or information specifically for the listed content objects. Other selection method types, information, and/or available operations may be presented and/or made available to the user without departing from the scope of this disclosure. In some implementations, the suggested optimizations 502 can be used as input for the content optimization service 110 (described below), which applies the suggested modifications 502 to the content objects 114.

Returning to FIG. 1, the EPS 102 further includes a content optimization service 110. The content optimization service 110 is responsible for updating the content objects 114 in the example distributed computing system 100. In some implementations, the content optimization service 110 receives a set of modification objects which represent the suggested modifications to the content objects 114 to rectify inconsistencies between the content objects 114 and the meta-model 116 identified by the content analyzer 109. In some implementations, the content optimization service 110 also updates a Portal Content Directory (PCD). The PCD is a main repository for ERP content, both delivered with the portal and created by enterprise portal administrators. In some implementations, the PCD can contain a hierarchy of folders, each of which can contain semantic objects, such as iViews, Pages, and Roles. In some implementations, the PCD can be stored in an ERP database and accessed using a PCD Generic Layer (GL), a Java Naming and Directory Interface (JNDI) provider that implements additional functionality, including the following:

Personalization: The PCD enables portal objects to be personalized. For each attribute of each portal object, different values can be stored for each user. For example, an iView that displays the weather can have an attribute called City. Each enterprise portal user can set the City attribute for that iView to a different city, so the weather for that city is displayed for that enterprise portal user.

Delta Links: The PCD enables the creation of enterprise portal objects whose attributes are inherited from another enterprise portal object. Changes on the original object update the delta links.

Locking: The PCD enables the locking of objects to avoid concurrent modifications.

Once the suggested modifications are applied, the enterprise portal administration tools will reflect the state of the modified content objects 114.

The EPS 102 further includes a content optimization tool 113. In some implementations, the content optimization tool 113 is an application providing GUI interfaces for: 1) initiation of a content analyzer 109 analysis operation; 2) presentation of a status interface of the initiated content analyzer 109 analysis operation (see FIG. 4); 3) presentation of an interface listing suggested content object 114 optimizations and allowing an administrator or other suitable user to select/apply all or a subset of the suggested optimizations to the content objects 114 (see FIGS. 5); and 4) generation and presentation of an optimization status report interface following the application of the selected suggested optimizations to the content objects 114.

Figure 6:
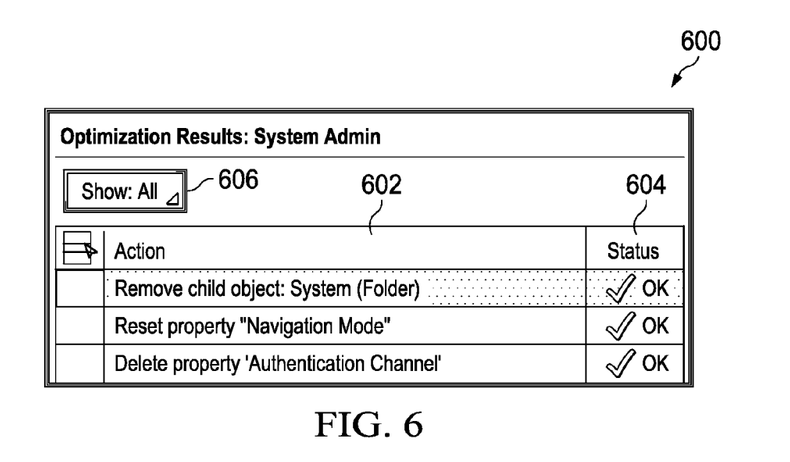
FIG. 6 illustrates an example optimization results interface.

Turning now to FIG. 6, FIG. 6 illustrates an example optimization results interface 600 presented to the user by the content optimization tool 113 following the application of the selected suggested modifications to the content objects 114. As illustrated, the optimization status report 600 includes the identified content objects 114 optimizations actions 602 performed and the status 604 of the content objects 114 optimization actions 602. Other presented information and/or available operations may be presented and/or made available to the user without departing from the scope of this disclosure. For example, a "Show" GUI element 606 may be provided to allow the list of actions 602 to be filtered (e.g., All, child objects only, delete property only, etc.). In some implementations, the content optimization tool 113 provides interfaces through a web browser. In some implementations, status information related to the update of the PCD consistent with the update to the content objects 114 is also displayed in the content optimization results status interface 600.

Optimize on Change

Returning now to FIG. 3, the Optimize on Change option 304 marks content to be optimized whenever it is changed. For example, a modification to the content by administration tools, import to the system, and/or programmatic changes through application code will trigger an optimization of the content. In the example screen shot, 304 indicates that all content applicable to the enterprise portal is to be marked. In some implementations, specific content, for example a particular Role, Page, and/or iView content object 114 may be individually marked and an optimization will automatically start once that content is changed while other content changes will not trigger an optimization. In some implementations, marking may be performed by an attribute associated with the content object 114.

In some implementations, selecting the Optimize on Change option 304 does not allow the user any control over the optimization process. Whereas with the Optimize Now option 302 present status indicators (see FIG. 4), a select optimizations dialog 500 (see FIG. 5), and a content optimization results dialog 600 (see FIG. 6), selecting the Optimize on Change option 304 will not present an optimization status or other dialogs to the user. What would be suggested optimizations are automatically applied once determined by one or more of the content analyzer 109, the content optimization service 110, and/or the content optimization tool 113. In some implementations, a user can review optimizations made to the content objects 114 by reviewing one or more optimization logs (not illustrated) saved as a result of the optimization process.

Returning to FIG. 1, the illustrated example distributed computing system 100 also includes a client 140. The client 140 may be any computing device operable to connect to or communicate with at least the EPS 102 using the network 130. In general, the client 140 comprises an electronic computer device operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the EPS 102. Once a particular client application 146 is launched, a user may interactively process a task, event, or other information associated with the EPS 102. Further, although illustrated as a single client application 146, the client application 146 may be implemented as multiple client applications in the client 140. In some implementations, the client application 146 may act as a GUI interface for the content optimization tool 113.

The illustrated client 140 further includes an interface 152, a processor 144, and a memory 148. The interface 152 is used by the client 140 for communicating with other systems in a distributed environment—including within the example distributed computing system 100—connected to the network 130; for example, the EPS 102 as well as other systems communicably coupled to the network 130 (not illustrated). The interface 152 may also be consistent with the above-described interface 104 of the enterprise server 102 or other interfaces within the example distributed computing system 100. The processor 144 may be consistent with the above-described processor 106 of the EPS 102 or other processors within the example distributed computing system 100. Specifically, the processor 144 executes instructions and manipulates data to perform the operations of the client 140, including the functionality required to send requests to the EPS 102 and to receive and process responses from the EPS 102. The memory 148 may be consistent with the above-described memory 107 of the EPS 102 or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. The GUI 142 may be used to view and navigate various web pages located both internally and externally to the EPS 102. In particular, the GUI 142 may be used to perform functions optimizing enterprise portal content.

There may be any number of clients 140 associated with, or external to, the example distributed computing system 100. For example, while the illustrated example distributed computing system 100 includes one client 140 communicably coupled to the EPS 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the EPS 102 or the client 140 itself, including digital data, visual information, or a GUI 142, as shown with respect to the client 140.

Figure 7:
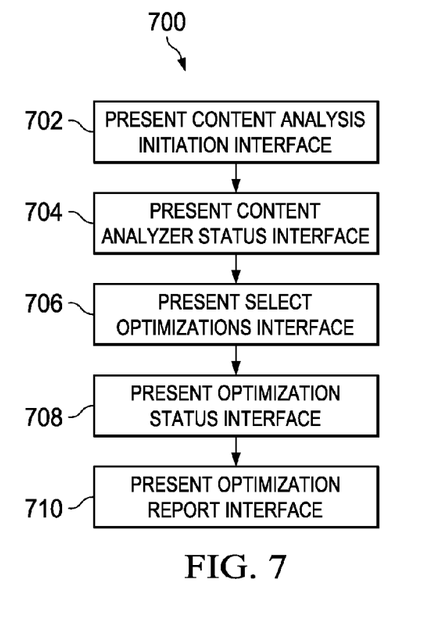
FIG. 7 is a flow chart of a user interface generation process flow.

Turning now to FIG. 7, FIG. 7 is a flow chart of a user interface generation process flow. For clarity of presentation, the description that follows generally describes method 700 in the context of FIGS. 1-6. However, it will be understood that method 700 may be performed, for example, by any other suitable system, environment, software, and hardware, or a combination of systems, environments, software, and hardware as appropriate. For example, one or more of the enterprise portal server, the client, or other computing device (not illustrated) can be used to execute method 700 and obtain any data from the memory of the client, the enterprise portal server, or the other computing device (not illustrated).

At 702, a content analysis initiation interface is presented to user by the content optimization tool. In other implementations, the content analysis initiation interface can be generated by another component of the example distributed computing system. In some implementations, the content analysis initiation interface may be a component (e.g., a button, menu item, etc.) of an existing GUI. In other implementations, the content analysis initiation interface may be a stand-alone GUI. Initiation of a content analysis, i.e., a request, using the content analysis initiation interface may be performed by clicking/selecting with a computer mouse or equivalent device, voice recognition, touch input using a touch interface, or other suitable method and/or device to indicate a content analysis should be initiated. Once a content analysis request is received, the content optimization tool sends a message to the content analyzer to start the content analysis and initiates a display of a content analyzer status interface. From 702, method 700 proceeds to 704.

At 704, the content optimization tool displays the content analyzer status interface. In other implementations, the content analyzer displays the content analyzer status interface. In some implementations, the content analyzer returns status information to the content optimization tool with which to update the content analyzer status interface. In other implementations, the content analyzer directly updates the content analyzer status interface. In some implementations, once the content analysis is complete, the content optimization tool removes the content analyzer status interface and initiates a display of the select optimizations interface. In other implementations, once the content analysis is complete, the content analyzer removes the content analysis status interface and initiates a display of the select optimizations interface. From 704, method 700 proceeds to 706.

At 706, the content optimization tool displays the select optimizations interface. In other implementations, the content analyzer displays the select optimizations interface. In some implementations, once the application of selected optimizations is requested, for example by selecting the "Apply" button shown in FIG. 5, the content optimization tool removes the content analysis status interface, initiates an update of the content using the content optimization service, and initiates a display of a content optimization status interface (not illustrated) similar to the content analysis status interface shown in FIG. 4. In other implementations, the content analyzer removes the content analysis status interface, initiates an update of the content using the content optimization service, and initiates a display of the content optimization status interface.

At 708, the content optimization tool displays the content optimization status interface. In other implementations, the content optimization service displays the content optimization status interface. In some implementations, the content optimization service returns status information to the content optimization tool with which to update the content optimization status interface. In other implementations, the content optimization service directly updates the content optimization status interface. In some implementations, once the content modification is complete, the content optimization tool removes the content optimization status interface and initiates a display of the optimization results interface. In other implementations, once the content optimization is complete, the content optimization service removes the content optimization interface and initiates a display of the optimization results interface. From 708, method 700 proceeds to 710.

At 710, the content optimization tool displays the optimization status interface. In other implementations, the content optimization service displays the optimization status interface. From 710, method 700 stops.

Figure 8:
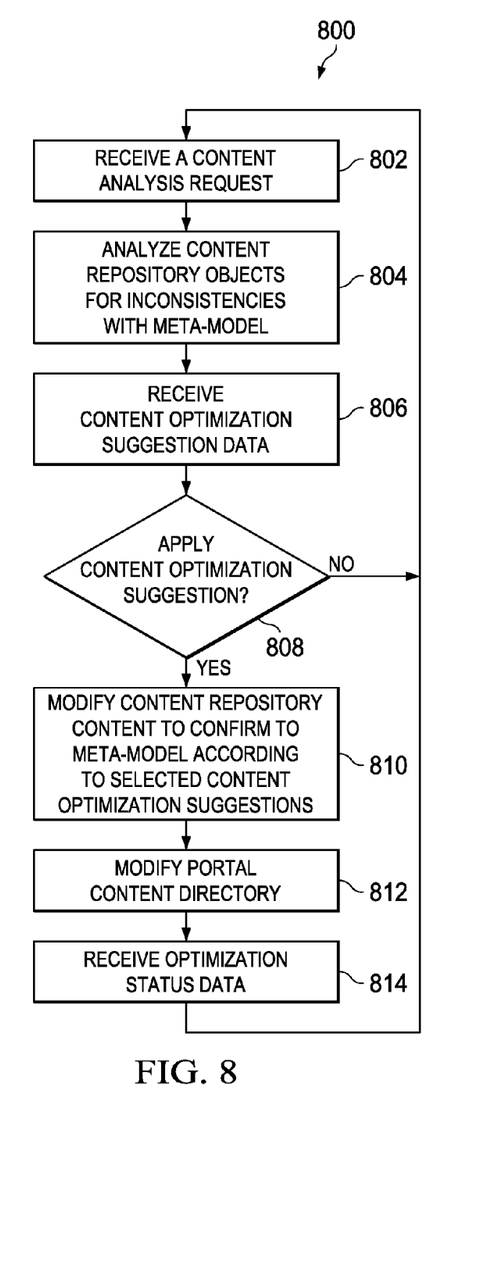
FIG. 8 is a flowchart of an example method for optimizing enterprise portal content.

Turning now to FIG. 8, FIG. 8 is a flowchart of an example method for optimizing enterprise portal content. For clarity of presentation, the description that follows generally describes method 800 in the context of FIGS. 1-7. However, it will be understood that method 800 may be performed, for example, by any other suitable system, environment, software, and hardware, or a combination of systems, environments, software, and hardware as appropriate. For example, one or more of the enterprise portal server, the client, or other computing device (not illustrated) can be used to execute method 800 and obtain any data from the memory of the client, the enterprise portal server, or the other computing device (not illustrated).

At 802, a content analysis request is received by the content optimization tool. For the purposes of this example, the content optimization tool will act as a coordinator of the requested content analysis. In other implementations, the requested content analysis can be coordinated by one or more hardware/software component(s) of example distributed computing system 100. The content optimization tool displays the content analysis status interface and requests that the content analyzer perform an analysis of content objects associated with the content repository. From 802, method 800 proceeds to 804.

At 804, the content analyzer analyzes content repository content objects for inconsistencies with the meta-model. The content analyzer passes status information to the content optimization tool with which to update the content analysis status interface. From 804, method 800 proceeds to 806.

At 806, the content optimization tool receives content optimization suggestion data from the content analyzer. The content optimization suggestion data identifies suggested modifications to content objects in the content repository to conform to the meta-model. The content optimization tool displays the select optimizations interface. From 806, method 800 proceeds to 808.

At 808, a determination is made whether a content optimization suggestion was selected to be applied to the appropriate content repository content objects. If at 808, it is determined that a content optimization suggestion was not selected to be applied to the appropriate content repository content objects, method 800 proceeds to 802. If at 808, however, it is determined that a content optimization suggestion was selected to be applied to the appropriate content repository content objects, method 800 proceeds to 810.

At 810, the content optimization tool displays an optimization status interface and initiates an optimization of the content repository content objects using the content optimization service and passing content optimization suggestion data corresponding to content optimization suggestions in the select optimizations interface. The content optimization tool also updates the optimization status interface. From 810, method 800 proceeds to 812.

At 812, the content optimization service also modifies the PCD consistent with the modifications made to the content repository content objects. Once complete with updates to the PCD, the content optimization tool removes the content optimization status interface. From 812, method 800 proceeds to 814.

At 814, the content optimization tool receives optimization status data from the content optimization service. The content optimization tool displays the optimization report interface displaying the status of updates to the content repository content objects. In some implementations, status updates to the PCD are also displayed in the optimization report interface. From 814, method 800 proceeds to 802.

In some implementations, suggested optimizations in the select optimizations interface that are unchecked are not applied during the update of the content repository content objects and may not be shown in the optimization report interface. During the next content analysis, they may be displayed in the select optimizations interface under a category, for example "Previously Skipped." This can provide a repeated opportunity for the prior suggested optimizations to be applied to appropriate content repository content objects. In some implementations, ignored suggested optimizations may be cleared from presented interfaces, electronically transferred using email and/or other suitable electronic transfer method, and/or saved to a file and/or other data structure.

In some implementations, the subject matter of this disclosure may be applied to collaborative pages, workspaces, and other suitable environments. Enterprise Workspace (EWS) technology leverages existing ERP capabilities and acts as an "add-on" to ERP technology. For example, EWS user interface (UI) technology may run on top of existing ERP technology. EWS functionality provides a flexible, intuitive environment for single EWS users and/or teams or groups of EWS users to create, integrate, organize, compose, modify, and delete, through the use of modules, both structured and unstructured content on EWS pages within an EWS. EWS technology allows EWS users to take advantage of a "self-service," that is a decentralized, approach in assembling content on EWS pages, often without involvement by an enterprise's information technology group.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/ or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
receiving a content analysis request associated with a content repository, wherein the content analysis request was triggered following a change to one or more content objects associated with the content repository, each particular content object of the one or more content objects marked by using an attribute associated with the particular content object to indicate if and when to start the content analysis request to optimize the particular content object when changed;
analyzing, using at least one computer, content objects associated with the content repository for inconsistencies between the content objects and a meta-model;
receiving content optimization suggestion data in the form of at least one content modification object representing at least one suggested modification to a particular content object of the content objects to rectify an identified inconsistency between the particular content object and the meta-model;

modifying, by operation of at least one computer, the content repository content objects using the content optimization suggestion data;

modifying a portal content directory (PCD) consistent with the modifications made to the content repository content objects to ensure consistency between the content objects and the meta-model, wherein the PCD is a main content repository for content associated with the content repository, and wherein the content is stored in semantic objects within PCD hierarchical data structures; and receiving optimization status data.

2. The computer-implemented method of claim 1, wherein the analysis of the content repository content objects is performed by a content analyzer.

3. The computer-implemented method of claim 1, further comprising determining that a content object optimization is to be performed.

4. The computer-implemented method of claim 1, wherein the modification of the content repository content objects is performed by a content optimization service.

5. The computer-implemented method of claim 3, wherein the determination is made based upon input received by a graphical user interface, wherein content optimization selections are selected.

6. A computer-program product, comprising computer-readable instructions embodied on tangible, non-transitory, computer readable media, the instructions operable when executed to perform operations to:

receive a content analysis request associated with a content repository, wherein the content analysis request was triggered following a change to one or more content objects associated with the content repository, each particular content object of the one or more content objects marked by using an attribute associated with the particular content object to indicate if and when to start the content analysis request to optimize the particular content object when changed;

analyze, using at least one computer, content objects associated with the content repository for inconsistencies between the content objects and a meta-model;

receive content optimization suggestion data in the form of at least one content modification object representing at least one suggested modification to a particular content object of the content objects to rectify an identified inconsistency between the particular content object and the meta-model;

modify the content repository content objects using the content optimization suggestion data;

modifying a portal content directory (PCD) consistent with the modifications made to the content repository content objects to ensure consistency between the content objects and the meta-model, wherein the PCD is a main content repository for content associated with the content repository, and wherein the content is stored in semantic objects within PCD hierarchical data structures; and receive optimization status data.

7. The computer-program product of claim 6, wherein the analysis of the content repository content objects is performed by a content analyzer.

8. The computer-program product of claim 6, further comprising instructions operable to determine that a content object optimization is to be performed.

9. The computer-program product of claim 6, wherein the modification of the content repository content objects is performed by a content optimization service.

10. The computer-program product of claim 8, wherein the determination is made based upon input received by a graphical user interface, wherein content optimization selections are selected.

11. A system, comprising:

memory operable to store at least one meta-model; and at least one hardware processor interoperably coupled to the memory and operable to:

receive a content analysis request associated with a content repository, wherein the content analysis request was triggered following a change to one or more content objects associated with the content repository, each particular content object of the one or more content objects marked by using an attribute associated with the particular content object to indicate if and when to start the content analysis request to optimize the particular content object when changed;

analyze, using at least one computer, content objects associated with the content repository for inconsistencies between the content objects and a meta-model;

receive content optimization suggestion data in the form of at least one content modification object representing at least one suggested modification to a particular content object of the content objects to rectify an identified inconsistency between the particular content object and the meta-model;

modify the content repository content objects using the content optimization suggestion data;

modify a portal content directory (PCD) consistent with the modifications made to the content repository content objects to ensure consistency between the content objects and the meta-model, wherein the PCD is a main content repository for content associated with the content repository, and wherein the content is stored in semantic objects within PCD hierarchical data structures; and receive optimization status data.

12. The system of claim 11, wherein the analysis of the content repository content objects is performed by a content analyzer.

13. The system of claim 11, further operable to determine that a content object optimization is to be performed.

14. The system of claim 11, wherein the modification of the content repository content objects is performed by a content optimization service.

15. The system of claim 13, wherein the determination is made based upon input received by a graphical user interface, wherein content optimization selections are selected.

* * * * *